3,647,569
METAL COATING RINSE COMPOSITION
George Schneider, Lynbrook Hills, Trevose, Pa., assignor to Amchem Products, Inc., Ambler, Pa.
No Drawing. Filed Nov. 27, 1968, Ser. No. 779,616
Int. Cl. C23f 7/26
U.S. Cl. 148—6.16      15 Claims

ABSTRACT OF THE DISCLOSURE

A dilute aqueous rinse composition for rinsing conversion-coated metal surfaces, the composition comprising water, at least about 0.02 g./l. of trivalent chromium, and ferricyanide in an amount at least sufficient to reduce the tendency of chromium from precipitating from the composition, the composition being prepared from an aqueous concentrate containing the trivalent chromium and ferricyanide constituents, the concentrate being aged prior to its being used to prepare the dilute aqueous rinse composition.

---

This invention relates to the art of treating metal surfaces to enhance their corrosion resistant properties and paint bonding characteristics and more particularly, it relates to a composition for rinsing protective coatings which have been applied to metal surfaces.

It is known to treat the surfaces of metals, such as iron, steel, zinc and aluminum, with aqueous coating solutions which contain chemical constituents that attack and dissolve the surface metal and function to form what are known in the art as "conversion coatings." These coatings, which are corrision resistant, protect the metal from those elements which cause metal corrosion. In addition, conversion coatings generally have good paint bonding characteristics and thus provide an excellent base for final finishes. Conversion coating solutions and processes for applying them are well known in the art.

In many cases, the corrosion resistant properties and paint bonding characteristics of conversion coatings of the phosphate or chromate type are enhanced by rinsing the coatings with dilute aqueous solutions containing hexavalent chromium and, optionally, other additives, such as phosphoric acid. Such solutions are often referred to as final rinses or final rinse solutions. Recently, final rinses containing partially reduced hexavalent chromium (thus containing some trivalent chromium) have been introduced.

Although the aforementioned final rinse solutions can enhance greatly corrosion resistant properties and paint bonding characteristics, they all have a serious common drawback, namely the toxic nature of the hexavalent chromium constituent. This drawback is serious from at least two standpoints, one being the handling of the solution and the other, the disposal of the used solution. With respect to the disposal problem, it is noted that hexavalent chromium in concentrations of as little as 1 p.p.m. can be highly toxic to living matter. The disposal problem can be dealt with by reducing the hexavalent chromium to the comparatively innocuous trivalent form before disposal, but this is highly exfensive and thus can be a major cost factor in the overall metal treating process.

For the above reason, it is highly desirable to have final rinse solutions which are totally free of hexavalent chromium, though, of course, capable of imparting to the coating improved corrosion resistant properties and paint bonding characteristics which are equal to or better than those imparted by conventional hexavalent chromium solutions.

Efforts to develop such solutions have resulted in the formulation of aqueous rinse solutions containing non-toxic trivalent chromium salts, such as chromium nitrate. However, the majority of trivalent chromium salts are not particularly stable in aqueous solution and they tend to hydrolyze almost immediately to chromium hydroxide, which forms a suspension in the solution. A bath of rinse solution having chromium hydroxide suspended therein can be operated successfully. However, within a few minutes, for example 2 to 5 minutes from the time of the formation of the suspension, the suspended chromium hydroxide begins to precipitate from the solution. When precipitation occurs, the rinse bath is substantially useless. The concentration of the necessary chromium constituent of the solution is diminished, thereby reducing the amount of chromium available to treat or rinse the conversion coating. Another undesirable aspect of the precipitation is that the precipitate or sludge, which contains unworked—and thus wasted—chromium, accumulates in the rinse tank.

The precipitation of chromium in the form of its hydroxide can be avoided to some extent by lowering the pH of the rinse solution, but unfortunately this affects deleteriously the quality of the rinsed coatings.

The inadequacies of previous efforts to provide a stable rinse solution made-up from trivalent chromium salts are manifest when it is considered that the rinse solution need not be stable for an indefinite or an even relatively long period of time. This is because a rinse solution has a limited life (for reasons other than stability) which is due to the fairly rapid contamination of the solution by the unused or dragged out chemical constituents of the coating solution as they are rinsed off the coated metal surface. Since a function of the rinse solution is to remove traces of "leftover" coating ingredients, thereby avoiding or reducing the tendency of the coating to blister, it is conventional practice to discard or dispose of the used solution periodically and replace it with a new or fresh solution.

The time it takes for a rinse bath to become contaminated beyond usefulness depends on a number of factors and, as a consequence, "contamination time" can vary from one coating operation to the next. Experience has shown that it is expedient to chuck the rinse solution at a convenient time during the coating operation even though the useful life of the rinse solution may not have terminated. For example, it is industry-wide practice to begin each new working day with a fresh rinse solution, although the used solution may not have been contaminated beyond operativeness. In situations where the coating operation is run through more than one eight-hour working shift, the used rinse solution is replaced usually between working shifts.

This procedure of the discarding of the used, but nevertheless useful, solution at a convenient stage of the coating operation has proven economic advantages over utilizing the solution until it is contaminated intolerably. For example, costly analysis of the rinse solution to determine the extent of contamination is avoided. It is noted also that most rinse solutions contain a high percentage of water and very small percentages of other ingredients which are more costly. Since the more costly ingredients are present in minute amounts, the expense incurred by chucking the solution is relatively small and is offset by other cost-saving features which are realized by disposing of the used solution periodically.

From the above discussion it will be appreciated that any rinse solution has a limited life so that rinse solutions containing trivalent chromium salts would be of value even if stable only for a few-hour period. However, as mentioned above, presently available aqueous rinse solutions of trivalent chromium salts are not stable over such a period of time.

In view of the shortcomings of the heretofore available final rinse solutions, it is an object of this invention to provide an improved final rinse composition which contains no hexavalent chromium or other toxic materials.

It is another object of this invention to provide a final rinse composition which contains trivalent chromium.

It is still another object of this invention to provide a trivalent chromium-containing final rinse composition wherein said chromium has little or no tendency to precipitate from the composition during the operating life of an industrial final rinse bath.

It is a further object of this invention to provide an improved method for rinsing conversion-coated metal surfaces.

In accordance with this invention it has been found that water soluble trivalent chromium-containing compounds can be used to formulate final rinse solutions or compositions which are stable for satisfactory periods of time when there is combined therewith a water soluble compound which is a source of ferricyanide. More specifically, it has been found that there can be formulated a satisfactorily stable final rinse composition comprising water, at least about 0.02 g./l. of chromium, and ferricyanide in an amount at least sufficient to reduce the tendency of chromium from precipitating from the composition, wherein the source of said chromium is a water soluble chromium-containing compound having the chromium present in its trivalent state and wherein the pH of the composition is within the range of from about 4 to about 7.

The rinse composition of this invention is very dilute, that is it contains a very high percentage of water.

Another aspect of this invention is the finding that in order to prepare a satisfactorily stable rinse composition as described above, the dilute composition must be prepared from an aqueous composite concentrate containing the sources of said chromium and ferricyanide constituents, which concentrate has been allowed to age for a period of time. As will be more fully discussed below, it has been found that if dilute aqueous rinse compositions are made up by adding said chromium- and ferricyanide-containing compounds directly to relatively large amounts of water, the chromium has a tendency to precipitate almost immediately from the composition in a form which is believed to be chromium hydroxide. On the other hand and in accordance with this invention, chromium precipitation can be avoided during the operating life of an industrial rinse bath by first combining said chromium and ferricyanide compounds in an aqueous concentrate, allowing the concentrate to age for a period of time, for example about one or more hours, and then diluting said concentrate with additional water to form the dilute rinse composition of this invention. From a practical standpoint, the aqueous composite concentrate should be aged long enough so that upon dilution, the resulting rinse bath will be stable for at least about 5 hours. About one to a few hours of aging will generally accomplish this.

The composition of this invention and its method of use, described in detail below, has the advantage over heretofore known chromium-containing rinse compositions that the presence of toxic hexavalent chromium is avoided. In addition, the rinse composition of this invention, unlike previously known trivalent chromium-containing rinse solutions, can be stabilized during use. The corrosion resistant properties and paint bondability characteristics of conversion coated and painted metal surfaces are improved as a result of rinsing the surfaces after they have been treated with a coating solution and before they are painted. In addition, the concentration of the active chemical ingredients of the rinse composition described herein is relatively small.

In formulating the rinse composition of this invention, the chromium can be added conveniently to the water in any of its water soluble forms in which the valence of the chromium is plus 3. For example, the chromium may be incorporated in the form of $CrCl_3$, $Cr(C_2H_3O_2)_3$, $Cr_2(SO_4)_3$, $(NH_4)Cr(SO_4)_2$ or $KCr(SO_4)_2$. Mixtures of such compounds can be utilized.

The particularly preferred source of trivalent chromium is chromium nitrate, that is $Cr(NO_3)_3$, since it has been found that conversion coatings rinsed with compositions formulated from chromium nitrate have improved paint adhesion and corrosion resistant properties over those rinsed with compositions formulated from other trivalent chromium-containing compounds. It is noted that an aqueous concentrate containing chromium nitrate and ferricyanide has a tendency to form undesirable gels when the relative amounts of the chromium and ferricyanide present in the concentrate fall within a certain range. This phenomenon is more fully explained below, as is a way to avoid formation of the gels.

The concentration of the chromium (calculated as Cr) in the rinse composition should be at least about 0.02 gram/liter (about 0.0004 mole/liter). When a lesser amount is used, the corrosion resistant properties and paint bonding characteristics of the rinsed conversion coating are rather poor.

The preferred chromium concentration is within the range of about 0.02 to about 0.1 gram/liter (about 0.0004 to about 0.002 mole/liter). It has been found that particularly good results are obtained economically when the chromium is present in this preferred range. Amounts of chromium in excess of about 0.2 gram/liter can be utilized, the upper concentration limit being dictated by the solubility of the material which is the source of the chromium. However, for the sake of economy, it will be usually advantageous to avoid the use of larger amounts.

The source of the ferricyanide constituent of the rinse composition described herein can be any of its water soluble forms. Examples of the sources of ferricyanide are the alkali-metal salts, including ammonium, and particularly preferred is sodium or potassium ferricyanide.

The source of the ferricyanide constituent can be also a water soluble ferrocyanide. The reason for this is that when such a ferricyanide is placed in an aqueous acidic environment such as exists in the rinse solutions of this invention, it is converted to ferricyanide. When a ferrocyanide is used, care should be taken to ensure that it is placed in an environment which is acidic enough to oxidize it to ferricyanide. In general when the rinse solutions of this invention are prepared in concentrated form, the concentrate will be sufficiently acid to oxidize the ferrocyanide to ferricyanide. On the other hand, the rinse solution of this invention can be used in a pH range which is not sufficiently acid to oxidize the ferrocyanide to ferricyanide, and therefore, the addition of a ferrocyanide salt directly to an operating bath should be avoided. Examples of water soluble ferrocyanide salts that can be utilized are the alkali-metal salts, including ammonium, and particularly preferred is the sodium salt.

Notwithstanding the availability of ferrocyanides as a source of the ferricyanide constituent, it is preferred that the source of ferricyanide be one of its water soluble forms.

The mere presence of ferricyanide functions to reduce the tendency of chromium precipitation from the rinse composition below that experienced in one which contains no ferricyanide. Therefore, the amount of ferricyanide in the rinse solution can be an amount selected to suit the stability properties that are desired. In general, it will be expedient to utilize an amount of ferricyanide such that there is at least about 0.1 mole/liter of ferricyanide for every mole/liter of chromium. In other words, the molar ratio of ferricyanide to chromium should be at least about 0.1. The stability of the solution can be increased as this ratio is increased. However, for economical reasons, it will be advantageous to keep down the amount of ferricyanide so that the molar ratio of ferricyanide to chromium does not exceed about 1. Nevertheless, amounts in excess of this equimolar ratio can be utilized, the upper concentration limit of the ferricyanide being limited by the solubility of the material which is the source of the ferricyanide.

The preferred ferricyanide to chromium molar ratio is within the range of about 0.2 to about 0.7. Accordingly, with a chromium concentration of about 0.02 gram/liter (about 0.0004 mole/liter) the concentration of ferricyanide should be at least about 0.008 gram/liter (about 0.00004 mole/liter), and is preferably in the range of about 0.017 gram/liter (about 0.00008 mole/liter) to about 0.06 gram/liter (about 0.00028 mole/liter). Similarly, when employing a chromium concentration of about 0.1 gram/liter (about 0.002 mole/liter) the ferricyanide concentration should be at least about 0.04 gram/liter (about 0.0002 mole/liter), and is preferably in the range of about 0.08 gram/liter (about 0.0004 mole/liter) to about 0.3 gram/liter (about 0.0014 mole/liter).

The pH of the rinse composition of this invention is important. Within the pH range of about 4 to 7, there can be obtained finished coatings which exhibit the required corrosion and paint adhesion characteristics, but outside this range rather poor coatings are obtained. The optimum pH is about 6.

In general, the pH of a rinse solution which is prepared according to the invention will "automatically" end up within the pH range of about 4 to 7. This is because of the acidic nature of the sources of trivalent chromium, particularly chromium nitrate, and the usual slight acidity of make-up (tap) water. If the pH of the solution does not fall within the range of about 4 to 7, or if it is desired to adjust the pH to a particular value within this range, then acid or alkali can be added as appropriate. Suitable acids are the mineral acids. Nitric acid is preferred, particularly when the source of chromium is chromium nitrite. Suitable alkalis are the alkali metal hydroxides, with ammonium hydroxide being preferred.

The recommended method for preparing the stable aqueous rinse solution of this invention comprises the aqueous dilution of an aged composite concentrate—that is an aqueous concentrate which comprises the sources of the trivalent chromium and ferricyanide constituents and which has been aged for at least about one hour from the time of preparation of the concentrate. It should be understood that the composite concentrate can be aged for longer periods of time, for example, a few hours or more. By following this method, there can be obtained an aqueous rinse solution in which there is little or no tendency over a satisfactory span of time for insoluble materials to form and precipitate.

Other methods that were utilized to formulate the aqueous rinse solution were unsatisfactory because they produced a solution in which insolubles formed and precipitated in a relatively short period of time, for example within a few minutes. This was experienced when the sources of the chromium and ferricyanide constituents were added directly to a water bath and also when individual aqueous concentrates of the chromium and ferricyanide constituents were added separately to a water bath. The same was experienced if the composite concentrate was not aged for a sufficient period of time. As noted hereinabove, one of the disadvantages of precipitation is that the concentrations of necessary constituents in the solution is diminished. This eventually renders the bath useless.

The composite concentrate can be prepared conveniently by adding each of the chromium and ferricyanide constituents to an appropriate amount of water or by preparing individual aqueous concentrates of each of the aforementioned constituents and then combining the resultant individual concentrates to prepare the composite concentrate. The term "composite concentrate" when used herein means an aqueous composition which contains at least about 50 grams of trivalent chromium and at least about 100 grams of ferricyanide per liter of water. The maximum amounts of the chromium and ferricyanide constituents which can be present in the concentrate are limited only by solubility of the materials which are the sources of these constituents. The relative amounts of chromium and ferricyanide constituents that are preferably present in the concentrate are such that the molar ratio of ferricyanide to chromium is within the range of about 0.2 to about 0.7. The reason for this is that upon dilution of the concentrate to form a rinse solution, there will be obtained a solution which contains the preferred relative amounts of chromium and ferricyanide. (As noted hereinabove the rinse bath comprises preferably a rinse solution in which the molar ratio of ferricyanide to chromium is within the range of about 0.2 to about 0.7.)

As discussed above, the composite concentrate must be aged for a period of time before it is used to prepare a rinse solution if the rinse solution is to be stable. It has been found that the longer the concentrate is aged, the longer a rinse solution prepared therefrom will be stable. In view of this and in view of the discussion which follows, it will be appreciated that the extent to which the concentrate is aged will depend upon the individual requirements of the user of the rinse solution.

As pointed out hereinabove, the useful life of any industrial or commercial rinse solution is limited for reasons other than stability. As the rinse solution is used, it becomes contaminated with coating constituents that are rinsed from coated metal surface. The rate at which the bath becomes contaminated depends, of course, on a number of factors, including for example the extent to which it is used, the amount of coating constituents in the coating solution, and the amounts rinsed off the coated surface. Although a rinse solution can be operated for longer or shorter periods of time, it is generally standard practice in the industry to dispose of the solution at the end of the working day, or in situations where the coating operation is an around the clock operation, after each eight-hour working shift (or some other convenient time), and then formulate a fresh solution. The reason for such practice is an economical one in that it has been found that it is generally less expensive to chuck the bath (due in part to the relatively small concentration of chemical ingredients that comprise the solution) after utilizing it for eight hours, more or less, than to analyze it and test it to determine whether in fact it is contaminated to the extent that it is no longer useful.

The above facts of life concerning the industrial use of rinse solutions are relevant to an appreciation that the composite concentrate can be aged only for as long a period of time as necessary to produce a rinse solution which is stable for that period of time demanded by a particular operation. In other words, the minimum aging time will depend upon the requirements of a particular operation. By way of illustration, experiments have shown that a rinse solution which was formulated from a composite concentrate that was aged for one hour was stable for about five hours. Likewise, one prepared from a concentrate that was aged for about three hours was stable for about 20 hours.

When formulating rinse solutions within the scope of this invention from an aged aqueous composite concentrate, it has been observed that upon preparation the solution is initially relatively clear, but after a period of time, depending upon the extent to which the aqueous composite concentrate was aged, the bath becomes cloudy. The rinse solution can be operated successfully while cloudy. However, eventually a precipitate settles from the cloudy solution and at this time the solution is no longer suitable for rinsing purposes.

A word of caution is in order in connection with the formulation of a composite concentrate wherein the source of chromium is chromium nitrate. As mentioned above, chromium nitrate is the preferred source of chromium because the overall corrosion resistant and paint bonding properties of the rinsed coating are better when chromium nitrate is used than when another source of chromium is used. However, it has been observed that when an aqueous composite concentrate containing chromium nitrate and ferricyanide is formulated, the concentrate, depending on the relative amount of chromium and ferricyanide present therein, has a tendency to solidify and form a brittle crystalline-like gel. This is undesirable because it is very difficult, if not impossible, to dissolve the gel when formulating the dilute rinse composition. This gelling phenomenon has not been noticed when the source of chromium is a source other than chromium nitrate. The time that it takes for the gel to form depends on the relative amounts of chromium and ferricyanide present in the concentrate, and on the source of the ferricyanide. In some cases the gel forms within a day or two; in other cases, the composite concentrate may remain liquid a number of weeks before the gel is formed or not gel at all. In general, the gelling can be postponed by storing the concentrate below ambient temperature. The concentrate appears to gel most rapidly, for example within 1 to 2 days, when the molar ratio of ferricyanide to chromium is within the range of about 0.1 to about 0.5 and when the source of ferricyanide is the potassium salt. As the molar concentration of these ingredients is reduced below about 0.1 or increased above about 0.5, the time it takes for the concentrate to gel is lengthened or gel formation is avoided. Thus, it will be advantageous to avoid preparing an aqueous composite concentrate from chromium nitrate when the molar ratio of ferricyanide to chromium is within the range of about 0.1 to about 0.5, and when the source of the ferricyanide is the potassium salt, if the composite concentrate is not going to be used relatively soon after its preparation and thus has a chance to gel before use.

Coated metal surfaces can be treated with the rinse composition of this invention by any suitable method, for example by immersing the surface in a bath of the composition or spraying the surfaces.

Exposure time of the coated surface to the rinse composition can vary over a wide range, for example from a few seconds to quite a few minutes. A contact time of from 15 to 120 seconds is recommended.

The treatment of the coated surface with the rinse composition can be carried out at any suitable temperature. For example, temperatures within the range of room temperature to about 120° F. can be utilized. Room temperature treatment is preferred inasmuch as this eliminates the necessity for providing and operating heating equipment.

The rinsed coating preferably should be dried immediately after the rinsing treatment. This may be accomplished by any of the methods well-known in the art, for example, oven drying, forced air drying, exposure to infra-red lamps, etc.

Examples 1–4 below are set forth for the purpose of showing the extent to which aging of a composite concentrate has a bearing on the stability of a dilute rinse solution which is prepared from the composite concentrate.

EXAMPLE 1

There was prepared a 215.5 ml. sample of an aqueous composite concentrate containing 48.5 g. of chromium nitrate and 36.9 g. of potassium ferricyanide. Immediately after preparing this sample, 2 mls. thereof were diluted with sufficient water to provide 1 liter of aqueous composition. (Calculations show that the 1 liter of aqueous composition contained 0.099 g. (0.0019 mole) of chromium and about 0.221 g. (0.0010 mole) of ferricyanide.) Before dilution the composite concentrate was dark green in color, and upon dilution it was also a green color. Almost immediately after dilution, the composition became cloudy and with 30 minutes, a heavy white precipitate settled from the composition.

EXAMPLE 2

An aqueous composite concentrate as set forth in Example 1 was prepared and allowed to age for 1 hour. The concentrate turned from a dark green to a brown color (greenish by reflected light, reddish by transmitted light). After 1 hour, 2 mls. of the concentrate were diluted with sufficient water to give 1 liter of aqueous composition as in Example 1 above. The diluted composition was of a light yellowish-brown color. This composition remained clear for about 5 hours, then became cloudy and a whitish precipitate settled.

EXAMPLE 3

An aqueous composite concentrate as set forth in Example 1 was prepared and allowed to age for about 3 hours. During the aging period, the concentrate turned in color from green to a dark reddish-brown. After 3 hours, 2 mls. of the concentrate were added to a sufficient amount of water to give 1 liter of aqueous composition which was of light yellowish-brown color upon preparation. This composition remained clear for about 8 hours and then became cloudy. A precipitate settled more than 20 hours after the concentrate was diluted.

EXAMPLE 4

There was prepared a 215.5 ml. sample of an aqueous composite concentrate containing 134.6 g. of chromium nitrate and 15.0 g. of potassium ferricyanide. The sample was allowed to age for 3 weeks. After the three-week aging period, 2 mls. of the concentrate were diluted with water to give 1 liter of aqueous composition. (Calculations show that the 1 liter of aqueous composition contained about 0.273 g. (0.0052 mole) of chromium and about 0.090 g. (0.004 mole) of ferricyanide.) After preparation of the diluted aqueous composition, it rapidly became cloudy. A flocculant reddish-brown precipitate settled 24 hours after the concentrate was diluted.

From Examples 1–4 above, it can be seen that the longer the concentrate is aged the longer a dilute rinse solution prepared therefrom will be stable. It is noted that the diluted composition of Example 1 which was prepared from a concentrate that was not aged would be unsatisfactory as a rinse solution because it was stable for only about 30 minutes. On the other hand, the diluted composition of Example 2 which was prepared from a concentrate that was aged for about 1 hour and which was stable for about 5 hours, would be a satisfactory rinse solution in those operations where the rinse bath containing the solution was used for about this period of time. With respect to Examples 3 and 4, the diluted compositions which were prepared from concentrates aged for about 3 hours and 3 weeks respectively, and which were stable for over 20 hours and for 24 hours respectively could be used satisfactorily in just about any industrial application.

The compositions of Examples 5–11 of Table I below are illustrative of the extent to which aqueous composite concentrates which contain potassium ferricyanide and which also contain, as the source of chromium, chromium nitrate tend to gel or not gel depending on the molar ratio of the ferricyanide to chromium constituents. The various aqueous composite concentrates set forth in Table I were prepared as follows. A concentrated aqueous solution containing about 897 g./l. of chromium nitrate was mixed with a concentrated aqueous solution containing about 228 g./l. of potassium ferricyanide in varying proportions to provide different aqueous composite concentrates containing both salts. The various composite concentrates, which for convenience were all made up in 215.5 ml. quantities, are set forth in Table I below. There are set forth also in Table I the calculated amounts of the chromium and ferricyanide constituents that would be present in 1 liter of the composition, as well as the molar ratio of ferricyanide to chromium. In the last column of Table I, there appears a description of the state of the concentrate after it had been allowed to stand for the times set forth.

TABLE I

| Example No. | Amount of salts in 215.5 ml. of aqueous composite conc. | | Calc. amounts of Cr and Fe (CN)$_6$ in 1 liter of aqueous composite conc. | | Molar ratio Fe(CN)$_6$: Cr in aqueous composite conc. | State of aqueous composite conc. after time period set forth |
|---|---|---|---|---|---|---|
| | Cr(NO$_3$)$_3$ grams | K$_3$Fe(CN)$_6$ grams | Cr, grams | Fe(CN)$_6$, grams | | |
| 5 | 18.9 | 44.4 | 19.2 | 137.5 | 1.76 | Liquid after 4 weeks. |
| 6 | 37.8 | 39.6 | 38.4 | 118.5 | 0.76 | Gel after 3 weeks. |
| 7 | 48.5 | 36.9 | 49.3 | 110.5 | 0.55 | Gel after 1 week. |
| 8 | 56.7 | 34.8 | 57.7 | 107.5 | 0.46 | Gel within 1–2 days. |
| 9 | 75.5 | 29.9 | 76.6 | 89.4 | 0.29 | Do. |
| 10 | 105.0 | 22.5 | 106.8 | 67.5 | 0.15 | Do. |
| 11 | 134.6 | 15.0 | 136.7 | 45.0 | 0.08 | Liquid after 4 weeks. |

From Table I above it can be seen that the compositions of Examples 8, 9 and 10 have molar ratios of ferricyanide to chromium which fall within the range of about 0.5 to about 0.1. All of these aqueous composite concentrates gelled within 1–2 days after preparation. On the other hand, it can be seen from the compositions of Examples 5, 6 and 7 that as the molar ratio of ferricyanide to chromium was increased, the concentrates remained in liquid form for longer periods of time. The composition of Example II shows that when said molar ratio was below 0.1, the concentrate was still liquid at the end of four weeks. The compositions set forth in Table I thus exemplify that if an aqueous composite concentrate containing chromium nitrate and potassium ferricyanide is not going to be used soon after it is prepared, it will be advantageous to formulate the concentrate in a manner such that the molar ratio of the ferricyanide to chromium is above about 0.5 and below about 0.1.

As mentioned hereinabove, the source of the ferricyanide constituent, as well as the relative amounts of ferricyanide and chromium, has an influence on the gelling tendency of an aqueous composite concentrate that contains chromium nitrate. This is exemplified when Example 12 below is compared with Example 9 in Table I above.

EXAMPLE 12

A 215.5 ml. sample of an aqueous composite concentrate containing 48.5 g. of chromium nitrate and 17 g. of ammonium ferricyanide was prepared. (The molar ratio of ferricyanide to chromium in the concentrate was 0.31.) The concentrate gelled within five weeks after preparation.

In comparing Example 12 with Example 9 of Table I, it can be seen that the composition of Example 12, which contained ammonium ferricyanide (as opposed to the potassium ferricyanide constituent of the composition of Example 9), gelled only after a much longer passage of time, even though the ferricyanide to chromium molar ratio of Example 12 was very close to that of Example 9.

Set forth in Table II below are results of a series of tests which show the effectiveness of rinse solutions within the scope of this invention. The test procedure included the steps of: (1) subjecting a set of polished steel panels to a chlorate-accelerated iron phosphate coating solution (Granodine 1100) and another set of the panels to a nitrite-accelerated zinc phosphate coating solution (Granodine 18); (2) immersing iron phosphate coated and zinc phosphate coated panels in a freshly prepared rinse solution for 30 seconds at 75° F., after which the rinsed panels were air dried; (3) painting the air dried panels with an acrylic paint (Duracron 100) which upon drying had a film thickness of 1.0 ml; making a scribe line on the panel through the paint film down to the base metal; and (4) subjecting the painted panels to a salt spray test (ASTM D 1654–61) for 336 hours after which the panels were cleaned and inspected for paint loss at the scribe line. The results of the salt spray test, which are the averages of the results of three tests, are reported in the last two columns of the table with reference being made to those panels that were coated with the zinc phosphate coating solution and those coated with the iron phosphate coating solution.

The amounts of chromium and ferricyanide constituents that were present in the rinse solutions are given in grams/liter, as well as moles/liter and the molar ratio of ferricyanide to chromium is set forth also.

Unless otherwise indicated, the sources of the chromium and ferricyanide constituents were chromium nitrate and potassium ferricyanide respectively. The pH of the rinse solution was 6.

In addition, the stability of the rinse solution is reported by reference to "excellent," "good," "poor," or "bad." By the term "Solution Stability" is meant the tendency for chromium to precipitate from the solution. The term "excellent" means that no precipitation was observed until at least 24 hours after preparation of the solution; the term "good" means no precipitation until 12 hours after the preparation; the term "poor" means precipitation within 2 hours after preparation; the term "bad" means precipitation almost immediately after preparation of the solution. The solutions were prepared from concentrates that were aged for 12 hours.

For comparative purposes there are set forth also in the table the results of salt spray tests that were performed on coated and painted panels that were not subjected to a rinse solution and on panels that were rinsed, but with rinse solutions not within the scope of this invention.

(Granodine 18). After the test panels were coated, they were rinsed in the various rinse solutions set forth in the

TABLE II

| Example No. | Amounts of Cr and Fe(CN)$_6$ in rinse solution | | | | Molar ratio, Fe(CN)$_6$ to Cr | Solution stability | ASTDM D 1654-61 (in inches) | |
|---|---|---|---|---|---|---|---|---|
| | Cr, g./l. | Fe(CN)$_3$, g./l. | Cr, moles/l. | Fe(CN)$_6$, moles/l. | | | Zinc phosphate coated panels | Iron phosphate coated panels |
| 13 | 0.038 | 0.275 | 0.0007 | 0.0013 | 1.8 | Excellent | Trace | 1/8 |
| 14 | 0.076 | 0.237 | 0.0015 | 0.0011 | 0.7 | ....do.... | ....do.... | 1/16 |
| 15 | 0.099 | 0.221 | 0.0019 | 0.0010 | 0.5 | ....do.... | ....do.... | 1/32 |
| 16 | 0.115 | 0.215 | 0.0022 | 0.0010 | 0.5 | ....do.... | ....do.... | 1/32 |
| 17 | 0.153 | 0.179 | 0.0029 | 0.0008 | 0.3 | ....do.... | ....do.... | 1/32 |
| 18 | 0.214 | 0.135 | 0.0041 | 0.0006 | 0.1 | Good | ....do.... | 1/64 |
| 19 | 0.273 | 0.090 | 0.0052 | 0.0004 | 0.08 | Poor | ....do.... | 1/64 |
| 20 | 0.334 | 0.045 | 0.0064 | 0.0002 | 0.03 | Bad | ....do.... | 1/64 |
| 21 | 0.099 | [1] 0.126 | 0.0019 | 0.0006 | 0.3 | Good | ....do.... | 1/64 |
| 22 | [2] 0.054 | 0.221 | 0.001 | 0.001 | 1.0 | ....do.... | ....do.... | 5/16 |
| 23 | [3] 0.054 | 0.221 | 0.001 | 0.001 | 1.0 | ....do.... | ....do.... | 3/16 |
| 24 | [4] 0.054 | 0.221 | 0.001 | 0.001 | 1.0 | ....do.... | ....do.... | 3/16 |
| 25 | | | Not rinsed | | | | 3/8 | 3/8 |
| 26 | 0.393 | | 0.0075 | | | Bad | 3/64 | 1/64 |

[1] Source of ferricyanide was the ammonium salt thereof.
[2] Source of chromium was chromium sulfate.
[3] Source of chromium was chromium chloride.
[4] Source of chromium was chromium acetate.

NOTE.—The term "trace" means less than 1/64 inch loss of paint on each side of the scribe line.

With reference to the above table, it is pointed out that the salt spray test is an evaluation of the corrosion resistant properties of the coated and painted panels. It can be seen that the panels that were rinsed with the coating solutions within the scope of this invention (Examples 13-24) had better corrosion resistant properties than the panels that were not rinsed (those of Example 25). It is further noted that although the panels that were rinsed with the solution of Example 26, that is with a rinse solution that contained chromium but no ferricyanide, had good corrosion resistant properties, the stability of this solution was such that it almost immediately deteriorated after preparation. The panels that were rinsed with a solution containing only ferricyanide (Example 27) gave quite poor results on the iron phosphate coated panels. With respect to the stability of the rinse solution of Examples 19 and 20 it can be seen that as the molar ratio of ferricyanide to chromium falls below about 0.1, the stability of the solution begins to deteriorate. Thus, although rinse solutions such as these may perform adequately for short periods of time, difficulties would be encountered upon extended use of the solutions.

Examples set forth in Table III are additional illustrations of the effectiveness of rinse solutions within with the rinse solution. The test procedure utilized was similar to that utilized in connection with the examples the scope of this invention and also are illustrative of the extent to which the pH of the rinse solution has an influence on the corrosion properties of coated metals treated of Table II above.

In this series of tests, a set of panels made of iron and zinc and also panels of zinc-plated iron were treated with a chlorate-accelerated iron phosphate coating solution (Granodine 1100) and another set of panels was treated with a nitrite-accelerated zinc phosphate coating solution table except for one set of panels which was not rinsed. The rinsed panels were then dried and painted with a white acrylic-based paint (Duracron 100). The paint was baked onto a thickness within the range of 0.7 to 1.0 mil. The painted panels were then subjected to a salt spray test (ASTM D 1654-61) for 336 hours to determine their paint adhesion properties when exposed to a corrosive environment. Unless otherwise indicated, the sources of chromium and ferricyanide were chromium nitrate and potassium ferricyanide respectively. The pH of the solutions was adjusted by adding thereto dilute ammonium hydroxide to raise the pH or dilute nitric acid to lower the pH.

TABLE III

| Example No. | Amounts of Cr and Fe(CN)$_6$ in rinse solution | | | | Molar ratio, Fe(CN)$_6$ to Cr | pH of rinse solution | ASTM D 1654-61 (in inches) | |
|---|---|---|---|---|---|---|---|---|
| | Cr, g./l. | Fe(CN)$_6$, g./l. | Cr, moles/l. | Fe(CN)$_6$, moles/l. | | | Zinc phosphate coated panels | Iron phosphate coated panels |
| 28 | 0.022 | 0.064 | 0.00042 | 0.00030 | 0.7 | 4 | 3/32 | 3/8 |
| 29 | 0.022 | 0.064 | 0.00042 | 0.00030 | 0.7 | 5 | 1/32 | 1/8 |
| 30 | 0.022 | 0.064 | 0.00042 | 0.00030 | 0.7 | 6 | 1/64 | 3/32 |
| 31 | 0.022 | 0.064 | 0.00042 | 0.00030 | 0.7 | 7 | 1/16 | 3/16 |
| 32 | 0.22 | 0.64 | 0.0042 | 0.0030 | 0.7 | 6 | 1/32 | 3/32 |
| 33 | 0.22 | 0.64 | 0.0042 | 0.0030 | 0.7 | 7 | 1/32 | 1/8 |
| 34 | 0.11 | [1] 0.32 | 0.0021 | 0.0015 | 0.7 | 5.9 | 1/8 | 1/16 |
| 35 | | | Not rinsed | | | | 5/16 | [2] L.P. |
| 36 | 0.22 | | 0.0042 | | | 6 | 1/32 | 1/16 |
| 37 | 0.22 | | 0.0042 | | | 7 | 1/32 | 1/4 |

[1] Source of ferricyanide was the ammonium salt thereof.
[2] Complete loss of paint.

With respect to Examples 28 to 31 in Table III, it can be seen that the rinse solutions of Example 30 which had a pH of 6 gave the best overall results. Similarly, the rinse solution of Example 32 (pH 6) gave better overall results than the solution of Example 33 (pH 7). All of the rinse solutions within the scope of this invention (Examples 28-34) gave better results than Example 35 wherein the coated panels were not rinsed. Although the rinse solutions of Examples 36 and 37 (containing Cr, but no Fe(CN)$_6$) gave good results, these solutions, unlike those of Examples 28-34, were not stable.

Examples set forth in Table IV below illustrate the effectiveness of rinse solutions of this invention when used to rinse metals which have been coated with a chromate coating (as opposed to the phosphate-coated metals of the previous examples). A chromate coating solution containing nitrate (Granodine 92) was applied to galvanized steel panels after which the panels were rinsed with either water or a rinse solution within the scope of the invention. Chromium nitrate and potassium ferricyanide were the sources of the chromium and ferricyanide constituents in the rinse solution. The panels were then painted with an acrylic paint (Duracron 11–LW–370) and subjected to a salt spray test (ASTM D 1654–61) for 1000 hours.

um nitrate and potassium ferricyanide respectively.

9. A composition according to claim 8 wherein the

TABLE IV

| Example No. | Amounts of Cr and Fe(CN)₆ in rinse solution | | | | Molar ratio Fe(CN)₆ to Cr | ASTM D 1654-61 (in inches) |
| --- | --- | --- | --- | --- | --- | --- |
| | Cr. g./l. | Fe(CN)₆. g./l. | Cr. moles/l. | Fe(CN)₆. moles/l. | | |
| 38 | 0.099 | 0.221 | 0.0019 | 0.0010 | 0.5 | 1/32 |
| 39 | | Water rinse | | | | 7/16 |

It should be understood that other materials that are generally used in rinse solutions to obtain specialized effects can also be used in the rinse composition of this invention. Examples of such materials are surface active agents and water conditioners.

I claim:

1. An aqueous rinse composition for a conversion-coated metal surface comprising water, at least about 0.02 g./l. of chromium, and ferricyanide in an amount at least sufficient to reduce the tendency of chromium from precipitating from the composition, the molar ratio of ferricyanide to chromium being at least about 0.1, wherein the source of said chromium is a water soluble chromium-containing compound having the chromium present in its trivalent state, wherein the pH of the composition is within the range of from about 4 to about 7 and wherein the composition is prepared from an aged composite concentrate comprising said chromium and ferricyanide.

2. A composition according to claim 1 wherein the concentration of said chromium is within the range of about 0.02 g./l. to about 0.1 g./l.

3. A composition according to claim 1 wherein said molar ratio is within the range of about 0.2 to about 0.7.

4. An aqueous composition for rinsing a metal surface to which has been applied a conversion coating, said composition comprising water, about 0.02 g./l. to about 0.2 g./l. of chromium, and ferricyanide in an amount such that the molar ratio of ferricyanide to chromium is within the range of about 0.1 to about 1.0, wherein the source of said chromium is chromium nitrate, wherein the source of said ferricyanide is a water soluble ferricyanide compound, wherein the pH of the composition is within the range of from about 4 to 7 and wherein the composition is prepared from a composite concentrate comprising said chromium and ferricyanide that has been aged for at least one hour.

5. A composition according to claim 4 wherein the concentration of said chromium is within the range of about 0.02 to about 0.1 g./l., said molar ratio is within the range of about 0.2 to about 0.7 and wherein the source of said ferricyanide is potassium ferricyanide.

6. A composition according to claim 5 wherein the pH of the composition is about 6.

7. An aged liquid composition comprising water, at least about 50 gms./l. of chromium, and ferricyanide, the molar ratio of said ferricyanide to chromium being at least about 0.1, the source of said chromium being a water soluble chromium-containing compound having the chromium present in the trivalent state, and the source of said ferricyanide being a water soluble compound selected from the group consisting of ferricyanide and ferrocyanide compounds.

8. A composition according to claim 7 wherein the sources of said chromium and ferricyanide and chromium nitrate and potassium ferricyanide respectively.

9. A composition according to claim 8 wherein the molar ratio of ferricyanide to chromium is above about 0.5.

10. A method for rinsing a conversion coated metal surface comprising subjecting said surface to an aqueous rinse composition comprising water, at least about 0.02 g./l. of chromium and ferricyanide in an amount at least sufficient to reduce the tendency of chromium from precipitating from the composition, the molar ratio of ferricyanide to chromium being at least about 0.1, wherein the source of said chromium is a water soluble chromium-containing compound having the chromium present in its trivalent state, wherein the pH of the composition is within the range of from about 4 to about 7 and wherein said composition is prepared from an aged composite concentrate comprising said chromium and ferricyanide, withdrawing said surface from said rinse composition, and drying the rinsed surface.

11. A method according to claim 10 wherein said chromium is present in an amount within the range of about 0.02 g./l. to about 0.2 g./l., wherein said ferricyanide is present in an amount such that the molar ratio of ferricyanide to chromium is within the range of about 0.1 to about 1.0, and wherein the sources of said chromium and ferricyanide are chromium nitrate and potassium ferricyanide respectively.

12. A method according to claim 11 wherein said chromium is present in an amount within the range of about 0.02 to about 0.1 g./l. and wherein said molar ratio is within the range of about 0.2 to about 0.7.

13. A method according to claim 12 wherein the pH of the composition is about 6.

14. A method according to claim 10 wherein said surface is coated with a phosphate conversion coating.

15. In the method wherein a conversion-coated metal surface is rinsed with a dilute aqueous rinse composition containing chromium, the improvement comprising rinsing said surface with a dilute aqueous acidic rinse composition containing at least about 0.02 g./l. of trivalent chromium and ferricyanide in an amount such that the molar ratio of ferricyanide to said chromium is at least about 0.1, wherein the chromium has little or no tendency to precipitate from the composition for at least a period of time of about 5 hours measured from the time of preparation of the composition.

References Cited

UNITED STATES PATENTS 1,719,930  7/1929  Gray _____ 148—6.2
3,222,226  12/1965  Maurer et al. _____ 148—6.2

JACOB H. STEINBERG, Primary Examiner

U.S. Cl. X.R.

148—6.2; 252—79.3; 134—3

UNITED STATES PATENT OFFICE
CERTIFICATE OF CORRECTION

Patent No. 3,647,569            Dated March 7, 1972

Inventor(s) George Schneider

It is certified that error appears in the above-identified patent and that said Letters Patent are hereby corrected as shown below:

IN THE SPECIFICATION

Column 1, line 61, "exfensive" should read --expensive--.

Column 7, line 70, "with" should read --within--.

Column 8, line 33, "(0.004 mole)" should read --(0.0004 mole)--.

Column 11, Table II, subheading, "Fe(CN)$_3$" should read --Fe(CN)$_6$--.

Column 11, the last complete paragraph should read:

--Examples set forth in Table III below are additional illustrations of the effectiveness of rinse solutions within the scope of this invention and also are illustrative of the extent to which the pH of the rinse solution has an influence on the corrosion properties of coated metals treated with the rinse solution. The test procedure utilized was similar to that utilized in connection with the examples of Table II above.--

IN THE CLAIMS

Claim 7, line 63, "the", first occurrence, should read -- its --.

Signed and sealed this 28th day of November 1972.

(SEAL)
Attest:

EDWARD M. FLETCHER, JR.
Attesting Officer

ROBERT GOTTSCHALK
Commissioner of Patents